(12) United States Patent
Tien et al.

(10) Patent No.: US 9,389,470 B1
(45) Date of Patent: Jul. 12, 2016

(54) PIXEL STRUCTURE

(71) Applicant: Au Optronics Corporation, Hsinchu (TW)

(72) Inventors: Kun-Cheng Tien, New Taipei (TW); Chien-Huang Liao, Hsinchu (TW); Shu-En Li, Tainan (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/855,384

(22) Filed: Sep. 16, 2015

(30) Foreign Application Priority Data

Jun. 25, 2015 (TW) .............................. 104120512 A

(51) Int. Cl.
*G02F 1/1343* (2006.01)
*G02F 1/1362* (2006.01)
*G02F 1/1368* (2006.01)

(52) U.S. Cl.
CPC ........ *G02F 1/134309* (2013.01); *G02F 1/1368* (2013.01); *G02F 1/136209* (2013.01); *G02F 2001/134345* (2013.01)

(58) Field of Classification Search
CPC ................... G02F 1/136209; G02F 1/134309; G02F 2001/134345; G02F 2001/134354
See application file for complete search history.

(56) References Cited

U.S. PATENT DOCUMENTS

| 6,424,398 | B1 | 7/2002 | Taniguchi | |
|---|---|---|---|---|
| 2005/0036085 | A1 | 2/2005 | Sunohara et al. | |
| 2007/0008444 | A1* | 1/2007 | Nakanishi | G02F 1/1337 349/43 |
| 2007/0247559 | A1* | 10/2007 | Tasaka | G02F 1/133707 349/46 |
| 2008/0049155 | A1* | 2/2008 | Yagi | G02F 1/136259 349/39 |
| 2009/0219458 | A1* | 9/2009 | Endo | G02F 1/133512 349/58 |
| 2011/0149223 | A1 | 6/2011 | Tsao et al. | |
| 2012/0127067 | A1* | 5/2012 | Tseng | G02F 1/134336 345/87 |
| 2012/0162559 | A1 | 6/2012 | Kim et al. | |
| 2012/0218325 | A1* | 8/2012 | Hiroki | G09G 3/003 345/697 |

* cited by examiner

*Primary Examiner* — Mohsen Ahmadi
(74) *Attorney, Agent, or Firm* — Jianq Chyun IP Office

(57) ABSTRACT

A pixel structure includes a plurality of sub-pixels arranged in an array. Each of the sub-pixels includes an active device and a pixel electrode electrically connected to the active device. A disclination area and a plurality of domains separated by the disclination area are defined in each of the pixel electrodes, respectively. Here, only a portion of the sub-pixels further includes a light-shielding pattern arranged corresponding to the disclination area.

17 Claims, 10 Drawing Sheets

PIXEL STRUCTURE

CROSS-REFERENCE TO RELATED APPLICATION

This application claims the priority benefit of Taiwan application serial no. 104120512, filed on Jun. 25, 2015. The entirety of the above-mentioned patent application is hereby incorporated by reference herein and made a part of this specification.

FIELD OF INVENTION

The invention relates to a pixel structure; more particularly, the invention relates to a pixel structure that can resolve a view-angle induced color shift issue.

DESCRIPTION OF RELATED ART

Due to the superior characteristics of favorable space utilization, low power consumption, and no radiation, liquid crystal displays (LCDs) have gradually become the mainstream products in the market. In order for the LCD to display images with satisfactory display quality, various wide-view-angle LCDs including in-plane switching (IPS) LCDs, fringe field switching LCDs, and multi-domain vertically aligned (MVA) LCDs have been launched on the market.

The MVA LCDs achieve the wide-view-angle effects, whereas the transmittance of the MVA LCDs may vary in response to the changes to the view angle. That is, as the view angle alters, the brightness displayed by the conventional MVA LCDs may vary, which leads to issues of color shift, color washout, and so on.

To resolve said issues, each sub-pixel in the pixels is divided into two areas according to the related art, and the pixel electrodes in these two areas are respectively coupled to different voltages, so as to resolve the view-angle induced issues of color shift and color washout by changing the tilt angle of liquid crystals. Said solution is conducive to the reduction of color washout but is not very helpful to eliminate color shift.

SUMMARY

The invention is directed to a pixel structure that can resolve a view-angle induced color shift issue.

In an embodiment of the invention, a pixel structure that includes a plurality of sub-pixels arranged in an array is provided. Each of the sub-pixels includes an active device and a pixel electrode electrically connected to the active device. A disclination area and a plurality of domains separated by the disclination area are defined in each of the pixel electrodes, respectively. Here, only a portion of the sub-pixels further includes a light-shielding pattern arranged corresponding to the disclination area. The light-shielding pattern includes a first light-shielding portion and a second light-shielding portion intersecting with each other. The first light-shielding portion has an area X1, the second light-shielding portion has an area X2, an area of each of the sub-pixels is Z, and X1, X2, and Z satisfy at least one of a relation (1) and a relation (2):

$$1.58\% \leq X1/Z \leq 5.14\% \quad (1);$$

$$1.58\% \leq X2/Z \leq 5.14\% \quad (2).$$

In an embodiment of the invention, a pixel structure including a plurality of sub-pixels arranged in an array is provided. Each of the sub-pixels includes an active device, a pixel electrode electrically connected to the active device, and a light-shielding pattern. Here, a first disclination area, a second declination area intersecting with the first disclination area, and a plurality of domains separated by the first disclination area and the second disclination area are defined in each of the pixel electrodes. The sub-pixels include a first sub-pixel, a second sub-pixel, and a third sub-pixel, an overlapping area of the light-shielding patterns in the second and third sub-pixels and the first disclination area is X1, an overlapping area of the light-shielding patterns in the second and third sub-pixels and the second disclination area is X2, an overlapping area of the light-shielding pattern in the first sub-pixel and the first disclination area is Y1, an overlapping area of the light-shielding pattern in the first sub-pixel and the second disclination area is Y2, an area of each of the sub-pixels is Z, and an area of each of the sub-pixels is Z, and X1, X2, Y1, Y2, and Z satisfy at least one of a relation (3) and a relation (4):

$$1.58\% \leq (X1-Y1)/Z \leq 5.14\% \quad (3);$$

$$1.58\% \leq (X2-Y2)/Z \leq 5.14\% \quad (4).$$

In view of the above, the transmittance of different sub-pixels can be changed in response to the difference in the area of the light-shielding pattern in different sub-pixels, and thereby the view-angle induced color shift can be significantly reduced.

Several exemplary embodiments accompanied with figures are describe in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

First Embodiment

Figure 1A:
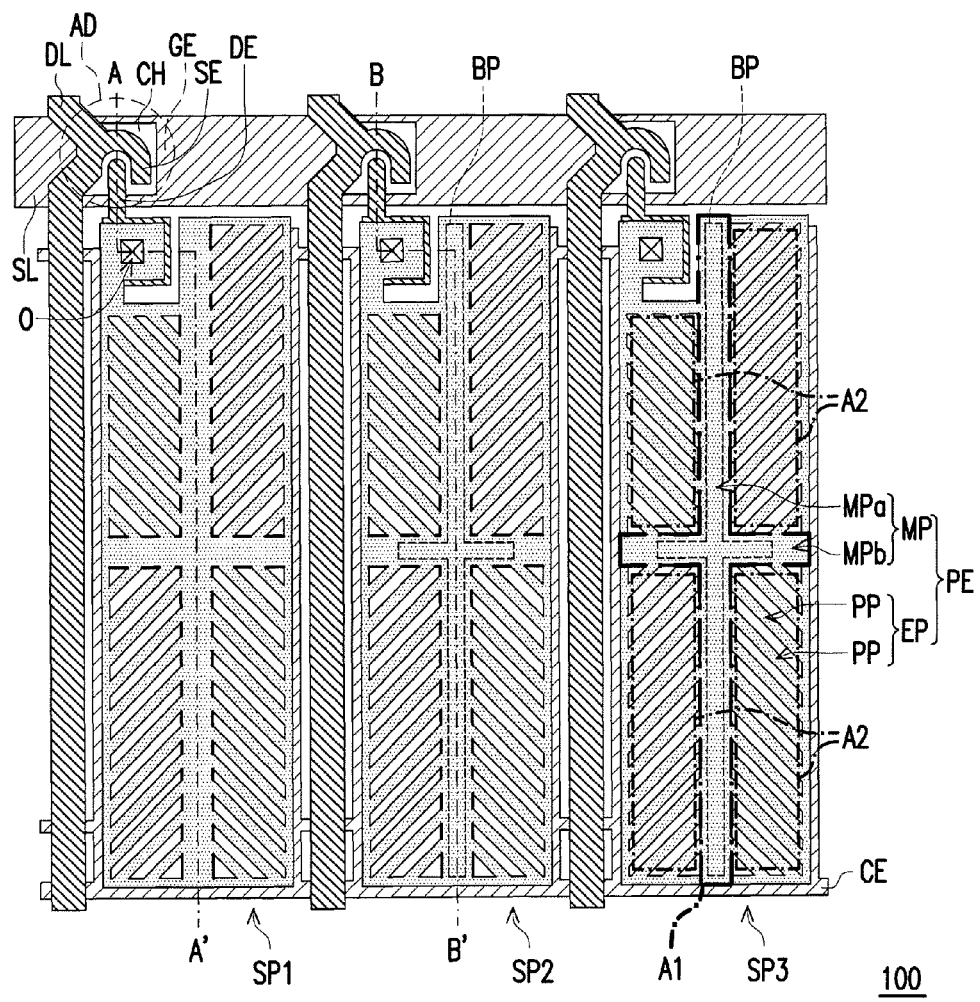
FIG. 1A is a schematic top view illustrating a pixel structure according to a first embodiment of the invention.

FIG. 1A is a schematic top view illustrating a pixel structure according to a first embodiment of the invention. In FIG.

Figure 1B:
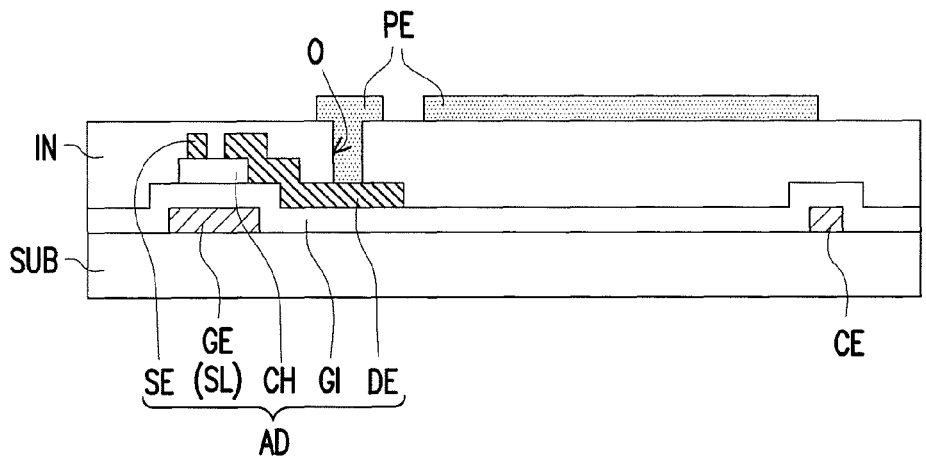
FIG. 1B and FIG. 1C are schematic cross-sectional views taken along sectional lines A-A' and B-B' depicted in FIG. 1A.
Figure 1C:
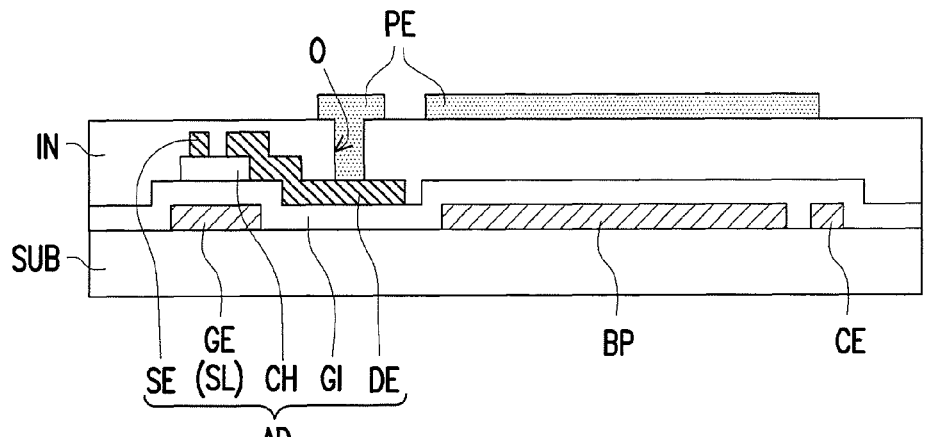

1A, some film layers are omitted. FIG. 1B and FIG. 1C are schematic cross-sectional views taken along sectional lines A-A' and B-B' depicted in FIG. 1A. With reference to FIG. 1A to FIG. 1C, the pixel structure 100 provided in the present embodiment includes a plurality of sub-pixels arranged in an array, and the sub-pixels include a first sub-pixel SP1, a second sub-pixel SP2, and a third sub-pixel SP3. The sub-pixels are arranged on a substrate SUB, for instance. The substrate SUB may further include a plurality of scan lines SL and a plurality of data lines DL; in FIG. 1A, only one of the scan lines SL is schematically depicted. The scan lines SL and the data lines DL are alternately arranged, so as to define the location of each sub-pixel. Besides, each of the sub-pixels is suitable for being driven by one of the scan lines SL and one of the data lines DL.

Particularly, each of the sub-pixels (including the first sub-pixel SP1, the second sub-pixel SP2, and the third sub-pixel SP3) includes an active device AD and a pixel electrode PE electrically connected to the active device AD, and each of the active devices AD is electrically connected to the corresponding scan line SL and the corresponding data line DL. Each of the active devices AD includes a gate GE, a gate insulation layer GI, a channel layer CH, a source SE, and a drain DE, for instance. The gates GE are connected to the scan lines SL, and the sources SE are connected to the data lines DL. As shown in FIG. 1B and FIG. 1C, the active device AD is, for instance, a bottom-gate thin film transistor (TFT), the gate GE is arranged on the substrate SUB, the gate insulation layer GI covers the gate GE, the channel layer CH is arranged on the gate insulation layer GI and located above the gate GE, and the source SE and the drain DE are structurally separated from each other and are extended from the gate insulation layer GI to the channel layer CH. The type and the form of the active devices AD may be changed in response to design requirements and should not be limited to those provided above.

Each of the sub-pixels SP (including the first sub-pixel SP1, the second sub-pixel SP2, and the third sub-pixel SP3) may further include an insulation layer IN. The insulation layer IN covers the active device AD and is suitable for providing the pixel electrode PE with a planar support surface. Besides, the insulation layer IN has an opening O exposing the drain DE, such that the pixel electrode PE is connected to the drain DE through the opening O; thereby, the active device AD can be electrically connected to the pixel electrode PE.

A disclination area A1 and a plurality of domains A2 separated by the disclination area A1 are defined in each of the pixel electrodes PE. Particularly, each of the pixel electrodes PE includes a main portion MP and a plurality of branch portions EP, and the main portion MP defines the disclination area A1. The branch portions EP are connected to the main portion MP, and each of the branch portions EP is separated by the main portion MP and respectively corresponds to one of the domains A2.

As shown in FIG. 1A, a shape of the main portion MP includes a cross shape, and the pixel electrode PE is divided into four domains A2. That is, each of the pixel electrodes PE is a four-domain electrode. Specifically, the main portion MP includes vertical extension portions MPa and lateral extension portions MPb, and the vertical and lateral extension portions MPa and MPb intersect at the center of the pixel electrode PE. Each of the branch portions EP includes a plurality of bar-shaped patterns PP, and the bar-shaped patterns PP extend obliquely and are parallel to each other. For instance, the bar-shaped patterns PP of each branch portion EP extend outwardly from the main portion MP, and the extension directions of the bar-shaped patterns PP of each branch portion EP are neither parallel to nor perpendicular to the vertical extension portions MPa and the lateral extension portions MPb. The included angle between the bar-shaped patterns PP and the vertical and lateral extension portions MPa and MPb is 45 degrees, for instance. Besides, the bar-shaped patterns PP located at two sides of the vertical extension portions MPa (or the lateral extension portions MPb) are symmetrically arranged, such that each pixel electrode PE is shaped as a fishbone.

As shown in FIG. 1A, the sub-pixels include a plurality of first sub-pixels SP1, a plurality of second sub-pixels SP2, and a plurality of third sub-pixels SP3; FIG. 1A schematically depicts one first sub-pixel SP1, one second sub-pixel SP2, and one third sub-pixel SP3. The first, second, and third sub-pixels SP1, SP2, and SP3 are sequentially arranged along a row direction, for instance; here, the first, second, and third sub-pixels SP1, SP2, and SP3 are red, green, and blue sub-pixels, for instance. However, the invention is not limited thereto.

Figure 1D:
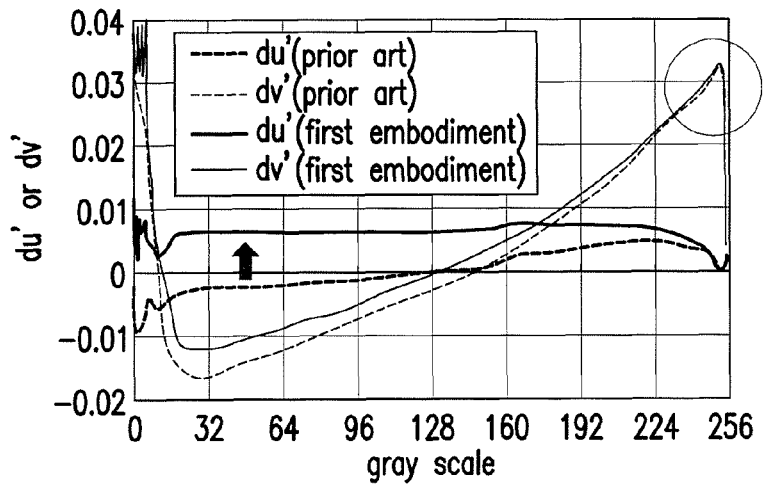
FIG. 1D illustrates the relationship between gray levels and color coordinate shifts of the conventional four-domain pixel structure and the pixel structure described in the first embodiment of the invention while a viewer observes the pixel structures at a 45-degree view angle.

FIG. 1D illustrates the relationship between gray levels and color coordinate shifts of the conventional four-domain pixel structure and the pixel structure described in the first embodiment of the invention while a viewer observes the pixel structures at a 45-degree view angle. Here, FIG. 1D shows the measurement results obtained in a color coordinate system stipulated by the International Commission on Illumination (CIE) in 1976, and du' and dv' respectively represent the shift of color coordinates u' and v' while the gray level is changed. Particularly, the greater the value of dv' is, the yellower the displayed image is. On the contrary, the less the value of dv' is, the bluer the displayed image is. The greater the value of du' is, the redder the displayed image is. On the contrary, the less the value of du' is, the greener the displayed image is. As long as the pixel structure 100 depicted in FIG. 1A is applied to an LCD, light leakage is likely to occur in the liquid crystal molecules tilting along the vertical extension portions MPa while the viewer observes the pixel structure 100 at a large horizontal view angle, and light leakage is likely to occur in the liquid crystal molecules tilting along the lateral extension portions MPb while the viewer observes the pixel structure 100 at a large vertical view angle. In the conventional four-domain pixel structure, each sub-pixel is equipped with a light-shielding pattern that covers the light leakage occurring at the vertical extension portions MPa and the lateral extension portions MPb correspondingly shown in FIG. 1A. Given that each sub-pixel is equipped with the light-shielding pattern BP, as shown by the circled portion in FIG. 1D, the displayed image at high gray level (e.g., the displayed image in white color or in skin-like color) is likely to become yellowish while the viewer observes the displayed image at a large view angle. Namely, if the displayed image is a human face, the skin tone observed by the viewer may become yellowish from reddish while the viewer observes the human face from a normal view angle (e.g., 0-degree view angle) to a large view angle (e.g., 45-degree view angle).

In the present embodiment, the second and third sub-pixels SP2 and SP3 further include the light-shielding patterns BP arranged corresponding to the disclination area A1, so as to shield the light leakage occurring at the disclination area A1. Since the first sub-pixel SP1 does not include light-shield patterns BP arranged corresponding to the disclination area A1, the light leakage occurring at the disclination area A1 of the first sub-pixel SP1 is not shielded. As shown by the thick solid lines and the thick dotted lines in FIG. 1D, the design described in the present embodiment allows du' to shift toward positive values, i.e., the ratio of red-color light observed at the large view angle can be effectively raised. Thereby, even though the viewer observes the displayed image at the large view angle, the viewer may observe the reddish skin tone.

Figure 1E:
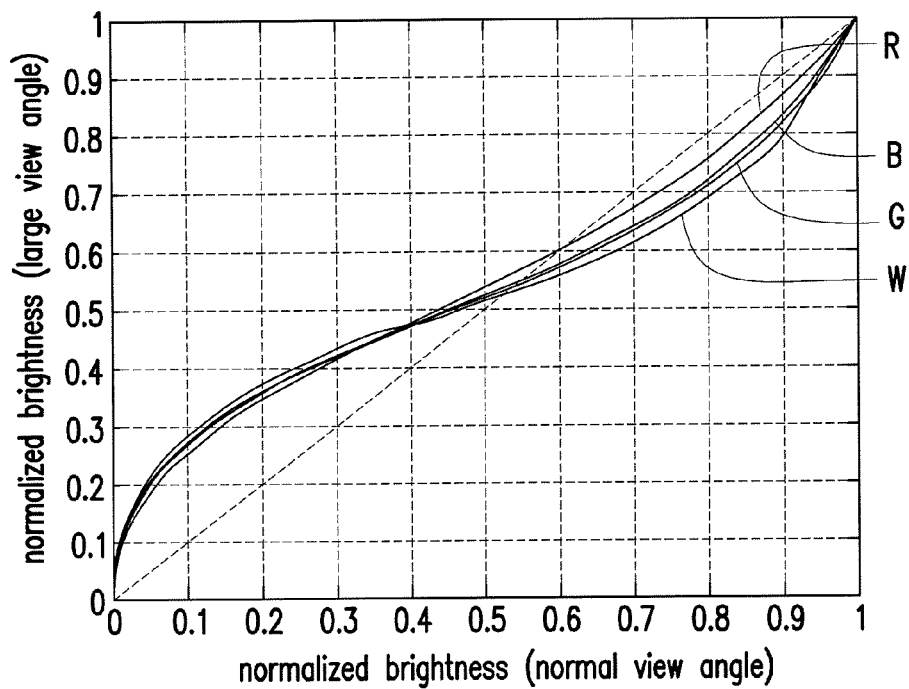
FIG. 1E illustrates the relative correlation between the brightness of the conventional four-domain pixel structure while a viewer observes the pixel structure at a 45-degree view angle and the brightness of the conventional four-domain pixel structure while the pixel structure is in a normal vision of the viewer.
Figure 1F:
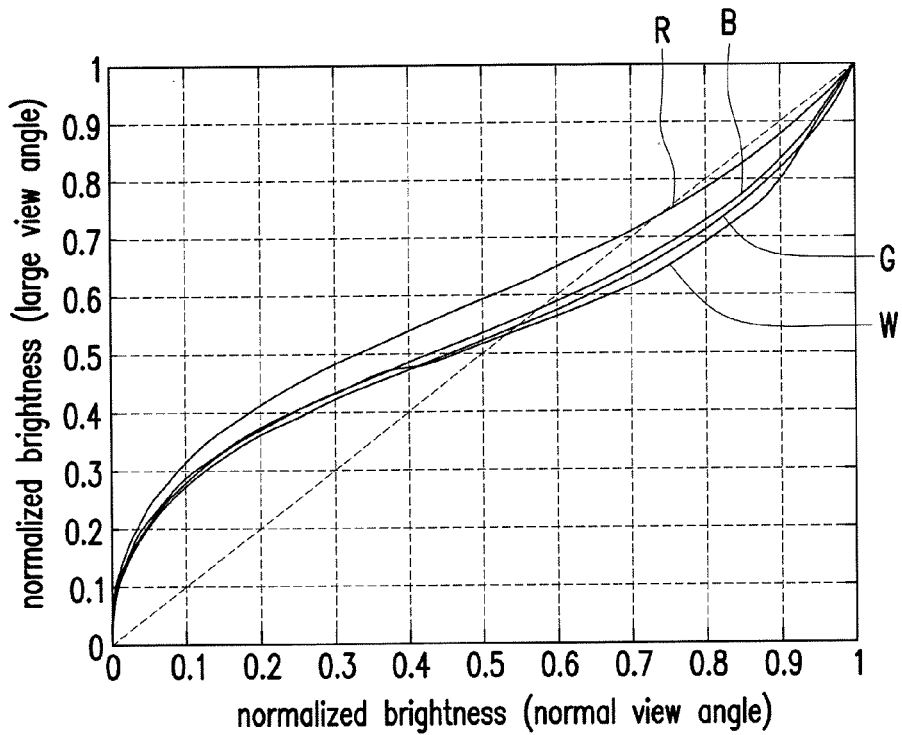
FIG. 1F illustrates the relative correlation between the brightness of the pixel structure described in the first embodiment while a viewer observes the pixel structure at a 45-degree view angle and the brightness of the pixel structure described in the first embodiment while the pixel structure is in a normal vision of the viewer.

FIG. 1E illustrates the relative correlation between the brightness of the conventional four-domain pixel structure while a viewer observes the pixel structure at a 45-degree view angle and the brightness of the conventional four-domain pixel structure while the pixel structure is in a normal vision of the viewer. FIG. 1F illustrates the relative correlation between the brightness of the pixel structure described in the first embodiment while a viewer observes the pixel structure at a 45-degree view angle and the brightness of the pixel structure described in the first embodiment while the pixel structure is in a normal vision of the viewer. Curves R, G, B, and W in FIG. 1E and FIG. 1F respectively represent a ratio of the brightness of red light, green light, blue light, and white light at the large view angle to the brightness of red light, green light, blue light, and white light in the normal vision of the viewer. As shown in FIG. 1E and FIG. 1F, only parts of the sub-pixels (e.g., the second and third sub-pixels SP2 and SP3) further include the light-shielding patterns BP arranged corresponding to the disclination area A1, and said design effectively improves the performance of the sub-pixels (e.g., the first sub-pixels SP1) that is not equipped with the light-shielding pattern BP when the viewer observes the pixel structure at the large view angle. That is, said design provided in the present embodiment allows the color tones of the displayed image at the large view angle to be modulated, so as to better resolve the color shift issue occurring while the viewer observes the displayed image at the large view angle.

In order to better resolve the color shift issue occurring while the viewer observes the displayed image at the large view angle, it should be mentioned that the ratio of red light in the pixels should be limited to a certain range, such that the skin tone observed at the large view angle is not overly reddish in comparison with the skin tone observed at the normal view angle. In the present embodiment, each light-shielding pattern BP in the second and third sub-pixels SP2 and SP3 includes a first light-shielding portion BP1 and a second light-shielding portion BP2 intersecting with each other. The first light-shielding portion BP1 has an area X1, the second light-shielding portion BP2 has an area X2, an area of each of the sub-pixels is Z, and X1, X2, and Z satisfy at least one of a relation (1) and a relation (2):

$$1.58\% \leq X1/Z \leq 5.14\% \qquad (1);$$

$$1.58\% \leq X2/Z \leq 5.14\% \qquad (2).$$

Note that the first sub-pixels SP1 are not equipped with the light-shielding pattern according to the present embodiment, and the difference between the areas of the light-shielding patterns in the first sub-pixels SP1 and the areas (X1 and X2) of the light-shielding patterns in the second and third sub-pixels SP2 and SP3 allows the ratio of red light to be controlled within a proper range while the pixel structure is observed at the large view angle, such that the skin tone observed at the large view angle is not overly reddish in comparison with the skin tone observed at the normal view angle. Particularly, when the area X1 of the first light-shielding portion BP1 of the second and third sub-pixels SP2 and SP3 satisfies the relation (1), the difference in the hue of the skin tone displayed by the pixel structure provided herein at the large view angle and at the normal view angle in a vertical direction cannot be realized by human eyes. That is, the angles of MacAdam tolerance ellipses range from −2.5 degrees to 2.5 degrees (i.e., Hue difference (ΔH) is about 5 degrees). Similarly, when the area X2 of the second light-shielding portion BP2 of the second and third sub-pixels SP2 and SP3 satisfies the relation (2), the difference in the hue of the skin tone displayed by the pixel structure provided herein at the large view angle and at the normal view angle in a horizontal direction cannot be realized by human eyes. That is, the angles of MacAdam tolerance ellipses range from −2.5 degrees to 2.5 degrees. In light of the foregoing, as long as the design of the first, second, and third sub-pixels SP1, SP2, and SP3 satisfies at least one of the relation (1) and the relation (2), the skin tone observed at the large view angle is not overly reddish in comparison with the skin tone observed at the normal view angle. In an embodiment of the invention, if X1/Z and X2/Z are approximately 3.32%, the difference in the hue of the skin tone (150, 100, 71) displayed by the pixel structure at the large view angle and at the normal view angle may approach to zero.

If X1/Z and X2/Z are greater than 5.14%, the skin tone displayed by the pixel structure at the large view angle is overly reddish; if X1/Z and X2/Z are less than 1.58%, the skin tone displayed by the pixel structure at the large view angle is overly yellowish.

The first light-shielding portions BP1 extend parallel to the data lines DL, for instance, and the second light-shielding portions BP2 extend parallel to the scan lines SL, for instance. Besides, the length of the second light-shielding portions BP2 is greater than the length of the first light-shielding portions BP1, for instance. The width of the first light-shielding portion BP1 and the width of the second light-shielding portion BP2 are respectively 4 micrometers, for instance. The area (Z) of each of the first, second, and third sub-pixels SP1, SP2, and SP3 is (245.1×81.7) micron square, (315×105) micron square, or (372×124) micron square, for instance.

In the present embodiment, the shape of the light-shielding patterns BP corresponds to the shape of the disclination area A1. The corresponding shape herein means similar shape and similar dimension or similar shape but different dimensions. As shown in FIG. 1A, the shape of the light-shielding patterns BP includes a cross shape, and the dimension of the light-shielding patterns BP is smaller than the dimension of the disclination area A1, for instance. An overlapping area of the light-shielding patterns BP and the disclination area A1 is equal to the area occupied by the light-shielding patterns BP. The light-shielding patterns BP, the scan lines SL, and the gates GE belong to the same film layer, which should however not be construed as a limitation to the invention. In another embodiment, the light-shielding patterns BP, the data lines DL, the sources SE, and the drains DE may be in the same film layer.

Based on different design requirements, the substrate SUB may further include other devices, such as the common electrode CE shown in FIG. 1A to FIG. 1C. The common electrode CE, the light-shielding patterns BP, the scan lines SL, and the gates GE belong to the same film layer, for instance, and the common electrode CE surrounds three sides of the pixel electrode PE and is structurally separated from the pixel electrode PE; however, the invention is not limited thereto.

In the present embodiment, the light-shielding patterns BP have the floating level, for instance. In another embodiment, the voltage level of the light-shielding patterns BP may be the same as the voltage level of the pixel electrodes PE. Alternatively, the voltage level of the light-shielding patterns BP may be the same as the voltage level of the common electrode CE.

Note that the first sub-pixels SP1 are red sub-pixels in the previous embodiment; however, the invention is not limited thereto. Based on different design demands, the first sub-pixels SP1 (i.e., the sub-pixels not equipped with the light-shielding patterns BP) may also be in other colors. The modifications may also be made to the following embodiments and thus will not be further explained hereinafter.

Second Embodiment

FIG. 2 to FIG. 8 are schematic top views of pixel structures according to a second embodiment of the invention. Note that some film layers are not illustrated in FIG. 2 to FIG. 8. The design concept of the pixel structure 200 provided in the present embodiment is similar to that of the pixel structure 100 provided in the first embodiment, and the difference therebetween lies in that the first sub-pixels SP1 in the pixel structure 200 provided herein are equipped with the light-shielding patterns BP corresponding to the disclination area, and the first sub-pixels SP1 in the pixel structure 100 provided in the first embodiment are not equipped with the light-shielding patterns BP corresponding to the disclination area A1. The same or similar devices in FIG. 1 and FIG. 2 to FIG. 8 are represented by the same or similar reference numerals.

With reference to FIG. 2 to FIG. 8, each of the pixel structures 200A to 200G includes a plurality of sub-pixels (e.g., first, second, and third sub-pixels SP1, SP2, and SP3) arranged in an array. Each of the first, second, and third sub-pixels SP1, SP2, and SP3 includes an active device AD, a pixel electrode PE electrically connected to the active device AD, and a light-shielding pattern BP. Here, a first disclination area A11, a second declination area A12 intersecting with the first disclination area A11, and a plurality of domains A2 separated by the first disclination area A11 and the second disclination area A12 are defined in each of the pixel electrodes PE. An overlapping area of the light-shielding patterns BP in the second and third sub-pixels SP2 and SP3 and the first disclination area A11 is X1, an overlapping area of the light-shielding patterns BP in the second and third sub-pixels SP2 and SP3 and the second disclination area A12 is X2, an overlapping area of the light-shielding pattern BP in the first sub-pixel SP1 and the first disclination area A11 is Y1, an overlapping area of the light-shielding pattern BP in the first sub-pixel SP1 and the second disclination area A12 is Y2, an area of each of the sub-pixels is Z, and an area of each of the first, second, and third sub-pixels SP1, SP2, and SP3 is Z, and X1, X2, Y1, Y2, and Z satisfy at least one of a relation (3) and a relation (4):

$$1.58\% \leq (X1-Y1)/Z \leq 5.14\% \quad (3);$$

$$1.58\% \leq (X2-Y2)/Z \leq 5.14\% \quad (4).$$

In the present embodiment, each pixel electrode PE includes a main portion MP and a plurality of branch portions EP. The main portion MP defines the first disclination area A11 and the second disclination area A12, the branch portions EP are connected to the main portion MP, and each of the branch portions EP is separated by the main portion MP and respectively corresponds to one of the domains A2. For instance, a shape of the main portion MP is a cross shape, each of the branch portions EP includes a plurality of bar-shaped patterns PP, and the bar-shaped patterns PP extend obliquely and are parallel to each other.

The pixel structures 200A to 200G shown in FIG. 2 to FIG. 8 are respectively described hereinafter.

Figure 2:
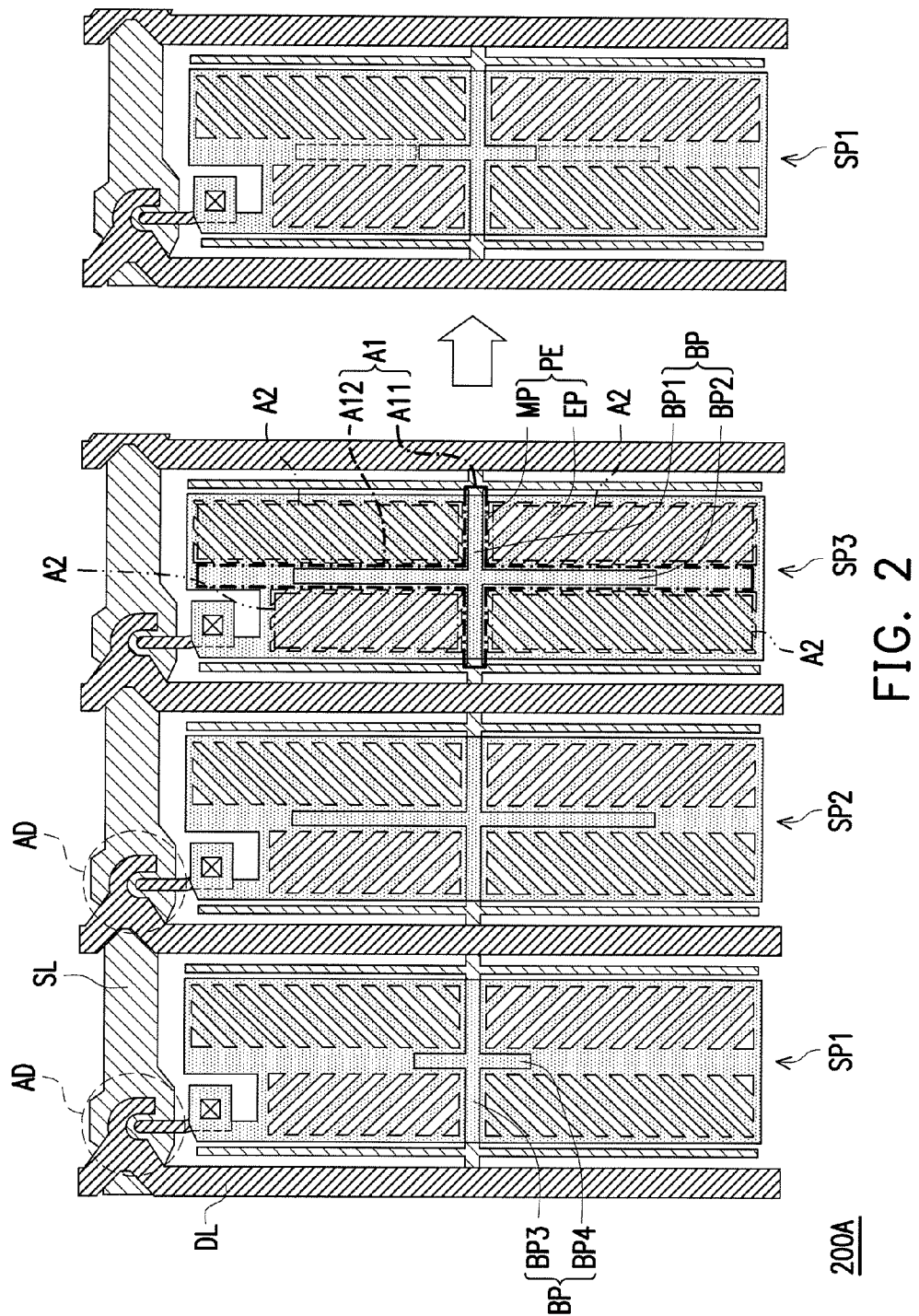
FIG. 2 to FIG. 8 are schematic top views of pixel structures according to a second embodiment of the invention.
Figure 3:
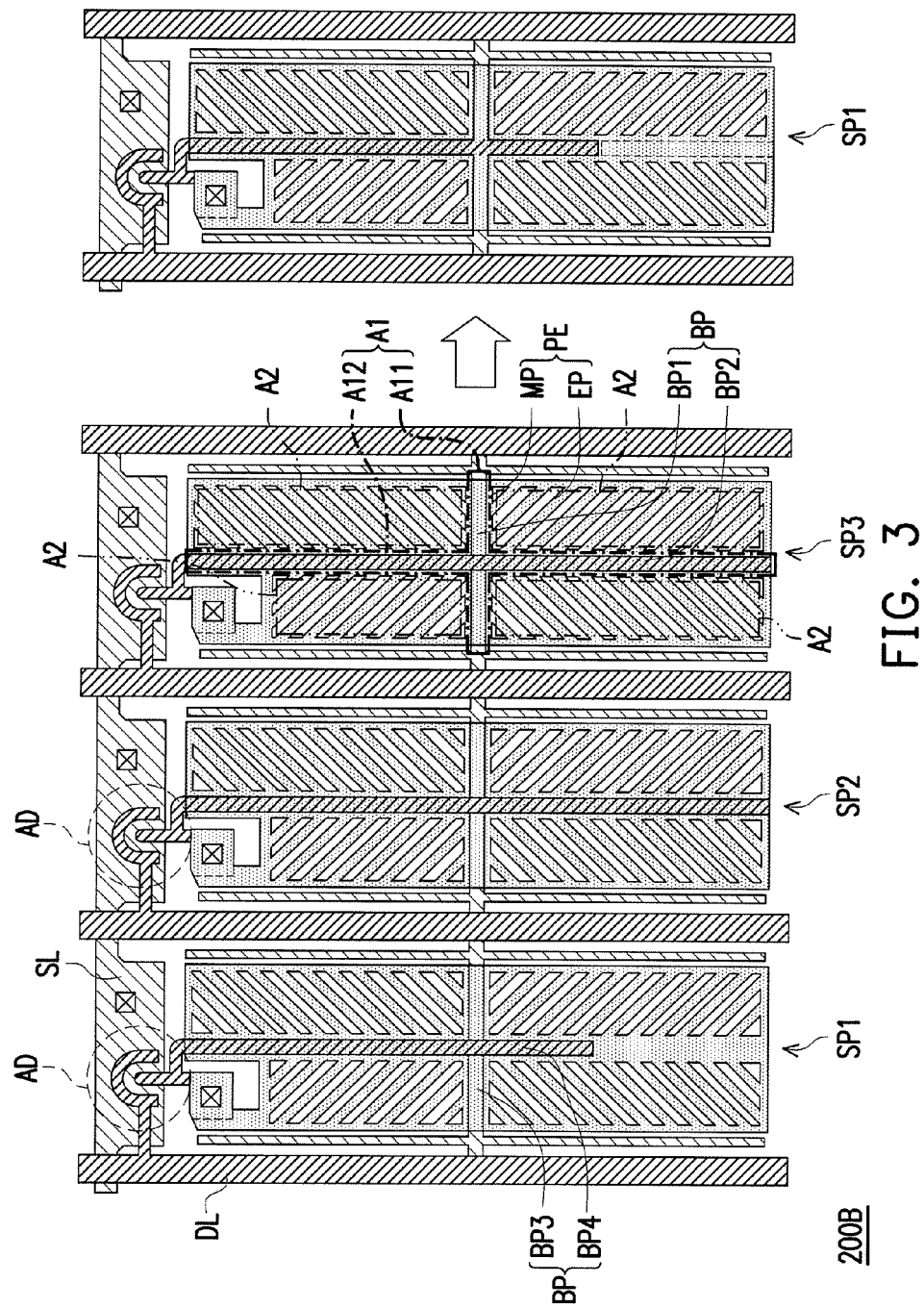
Figure 4:
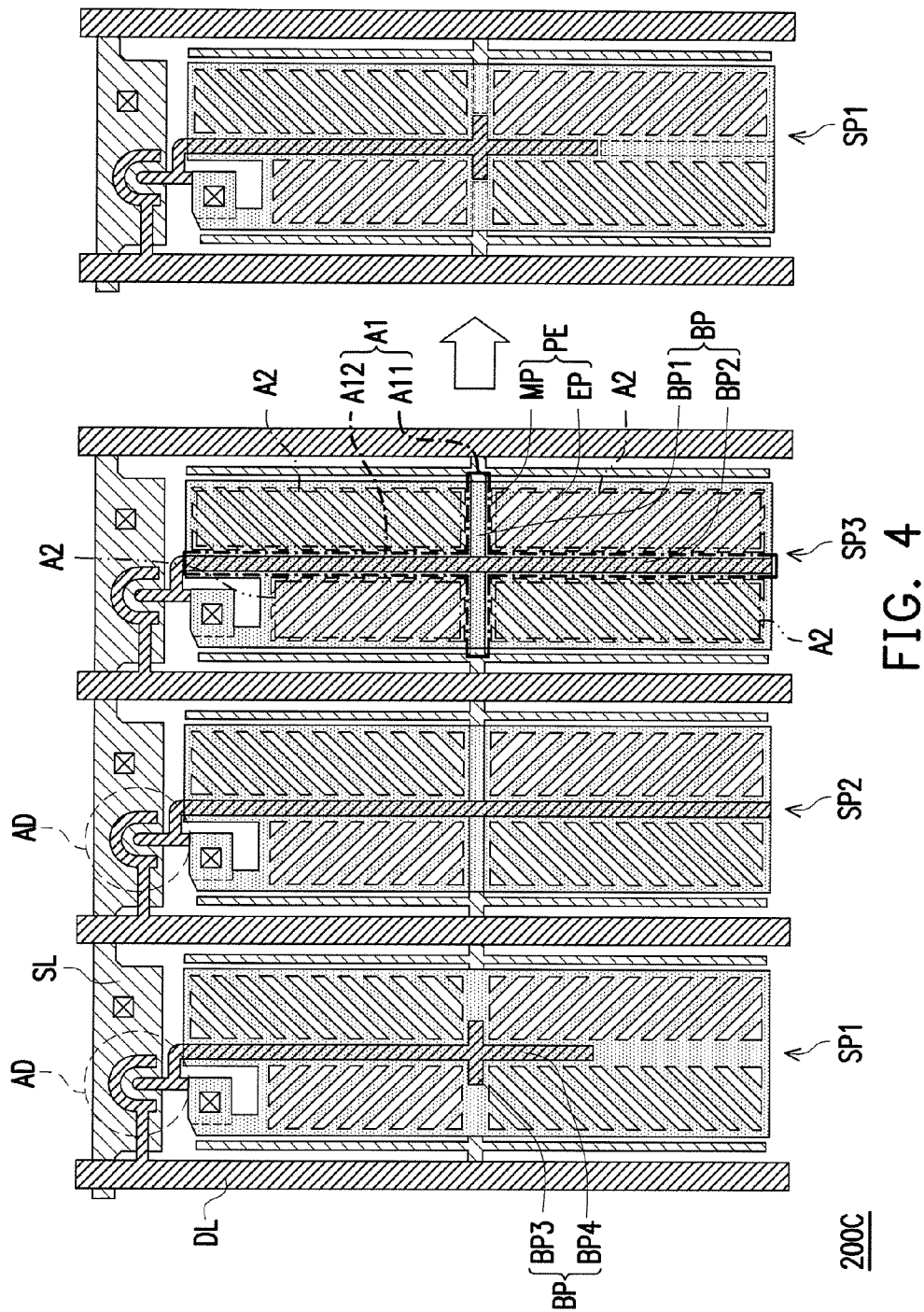

As shown in FIG. 2 to FIG. 4, in the pixel structures 200A, 200B, and 200C, each of the light-shielding patterns BP in the second and third sub-pixels SP2 and SP3 includes a first light-shielding portion BP1 and a second light-shielding portion BP2, an area of the first light-shielding portion BP1 is X1, an area of the second light-shielding portion BP2 is X2, and the first light-shielding portion BP1 intersects with the second light-shielding portion BP2. The light-shielding pattern BP in the first sub-pixel SP1 includes a third light-shielding portion BP3 and a fourth light-shielding portion BP4, an area of the third light-shielding portion BP3 is Y1, an area of the fourth light-shielding portion BP4 is Y2, the first light-shielding portion BP1 is parallel to the third light-shielding portion BP3 and intersects with the second light-shielding portion BP2, and the fourth light-shielding portion BP4 is parallel to the second light-shielding portion BP2 and intersects the third light-shielding portion BP3. For instance, the first light-shielding portion BP1 is orthogonal to the second light-shielding portion BP2, and the third light-shielding portion BP3 is orthogonal to the fourth light-shielding portion BP4. That is, the shape of each light-shielding pattern BP is the cross shape, for instance.

It should be mentioned that the first, second, third, and fourth light-shielding portions BP1, BP2, BP3, and BP4 in the pixel structure 200A depicted in FIG. 2 are formed by the same film layer. Specifically, the first, second, third, and fourth light-shielding portions BP1, BP2, BP3, and BP4 in the pixel structure 200A depicted in FIG. 2 and the scan lines SL belong to the same film layer. As clearly shown in FIG. 2, the overlapping area (i.e., X2) of the second light-shielding portions BP2 in the second and third sub-pixels SP2 and SP3 and the second disclination area A12 is greater than the overlapping area (i.e., Y2) of the fourth light-shielding portion BP4 in the first sub-pixel SP1 and the second disclination area A12, and the aforesaid relation (4) need be satisfied. Besides, in the pixel structure 200A, the overlapping area of the first light-shielding portions BP1 and the first disclination area A11 is equal to the overlapping area of the third light-shielding portions BP3 and the first disclination area A11, the relation (4) is not satisfied. As long as one of the relations (3) and (4) is satisfied by the pixel structure 200A provided in the present embodiment, the color shift defect occurring at the large view angle can be lessened.

In the pixel structure 200B shown in FIG. 3, the first and third light-shielding portions BP1 and BP3 are formed by the same film layer, and the second and fourth light-shielding portions BP2 and BP4 are formed by the same film layer. Here, the first and second light-shielding portions BP1 and BP2 belong to different film layers. Specifically, the first and third light-shielding portions BP1 and BP3 in the pixel structure 200B and the scan lines SL belong to the same film layer, and the second and fourth light-shielding portions BP2 and BP4 in the pixel structure 200B and the data lines DL belong to the same film layer. As clearly shown in FIG. 3, the overlapping area (i.e., X2) of the second light-shielding portions BP2 in the second and third sub-pixels SP2 and SP3 and the second disclination area A12 is greater than the overlapping area (i.e., Y2) of the fourth light-shielding portion BP4 in the first sub-pixel SP1 and the second disclination area A12, and the aforesaid relation (4) need be satisfied. Besides, in the pixel structure 200B, the overlapping area of the first light-shielding portions BP1 and the first disclination area A11 is equal to the overlapping area of the third light-shielding portions BP3 and the first disclination area A11, the relation (4) is not satisfied. As long as one of the relations (3) and (4) is satisfied by the pixel structure 200B provided in the present embodiment, the color shift defect occurring at the large view angle can be lessened.

In the pixel structure 200C shown in FIG. 4, the second, third, and fourth light-shielding portions BP2, BP3, and BP4 are formed by the same film layer, and the first light-shielding portions BP1 are formed by another film layer. Here, the first and second light-shielding portions BP1 and BP2 belong to different film layers. Specifically, the first light-shielding portion BP1 in the pixel structure 200C and the scan lines SL belong to the same film layer, and the second and fourth light-shielding portions BP2 and BP4 in the pixel structure 200C and the data lines DL belong to the same film layer. As clearly shown in FIG. 4, the overlapping area (i.e., X2) of the second light-shielding portions BP2 in the second and third sub-pixels SP2 and SP3 and the second disclination area A12 is greater than the overlapping area (i.e., Y2) of the fourth light-shielding portion BP4 in the first sub-pixel SP1 and the second disclination area A12, and the aforesaid relation (4) need be satisfied. Besides, in the pixel structure 200C, the overlapping area (i.e., X1) of the first light-shielding portions BP1 in the second and third sub-pixels SP2 and SP3 and the first disclination area A11 is greater than the overlapping area (i.e., Y1) of the third light-shielding portion BP3 in the first sub-pixel SP1 and the first disclination area A11, and the aforesaid relation (3) need be satisfied. The pixel structure 200C provided herein simultaneously satisfies both the relation (3) and the relation (4).

Figure 5:
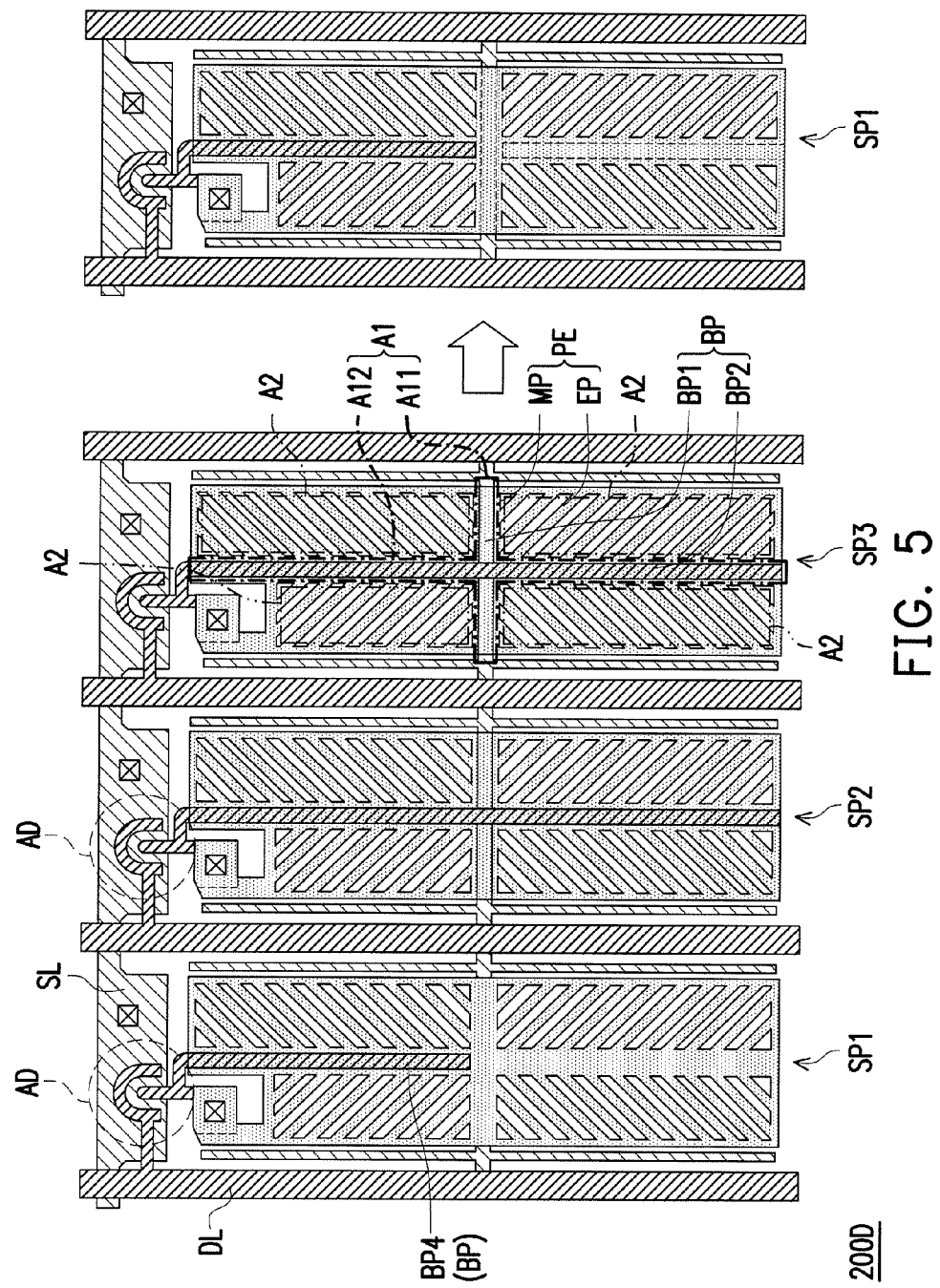
Figure 6:
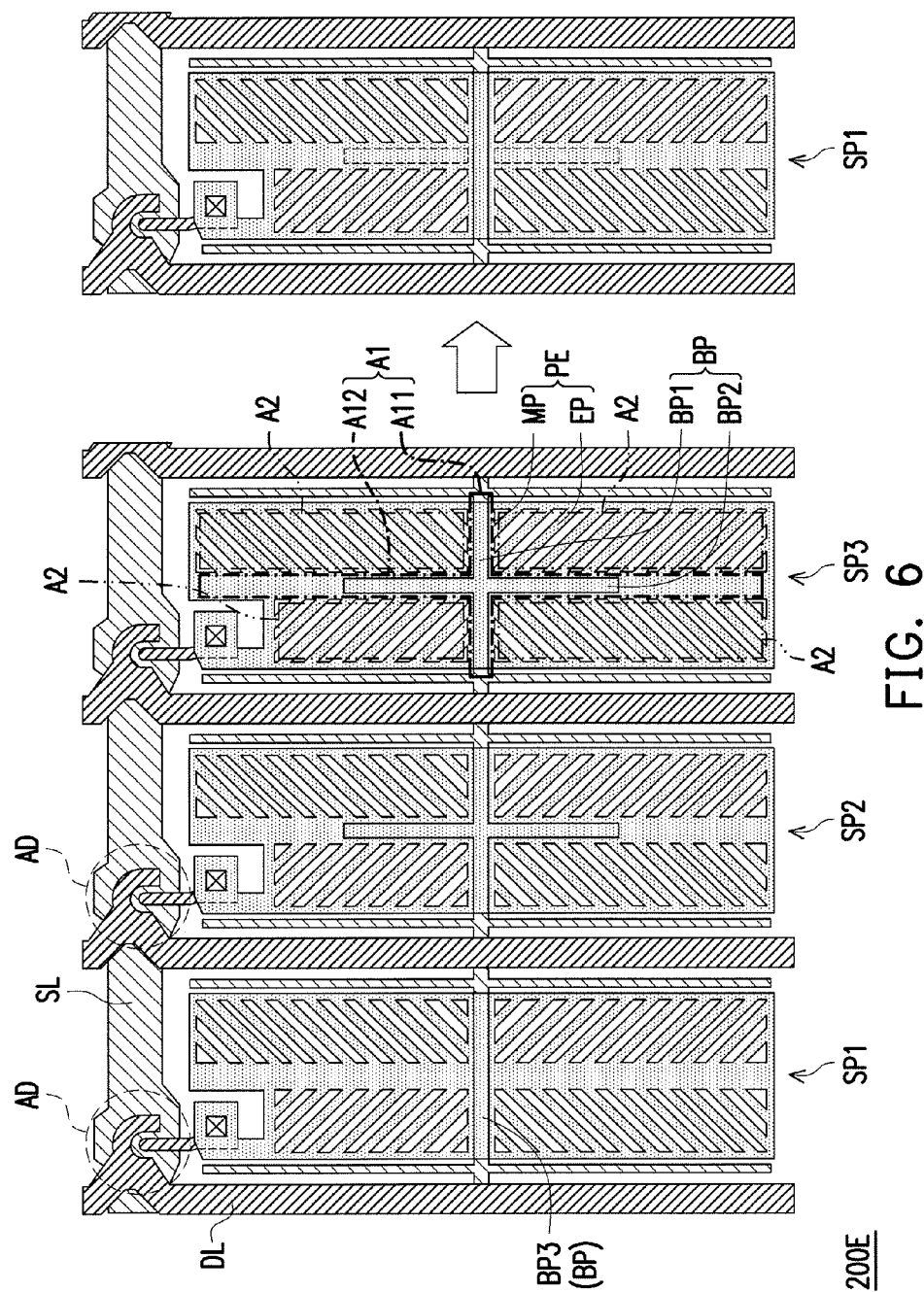
Figure 7:
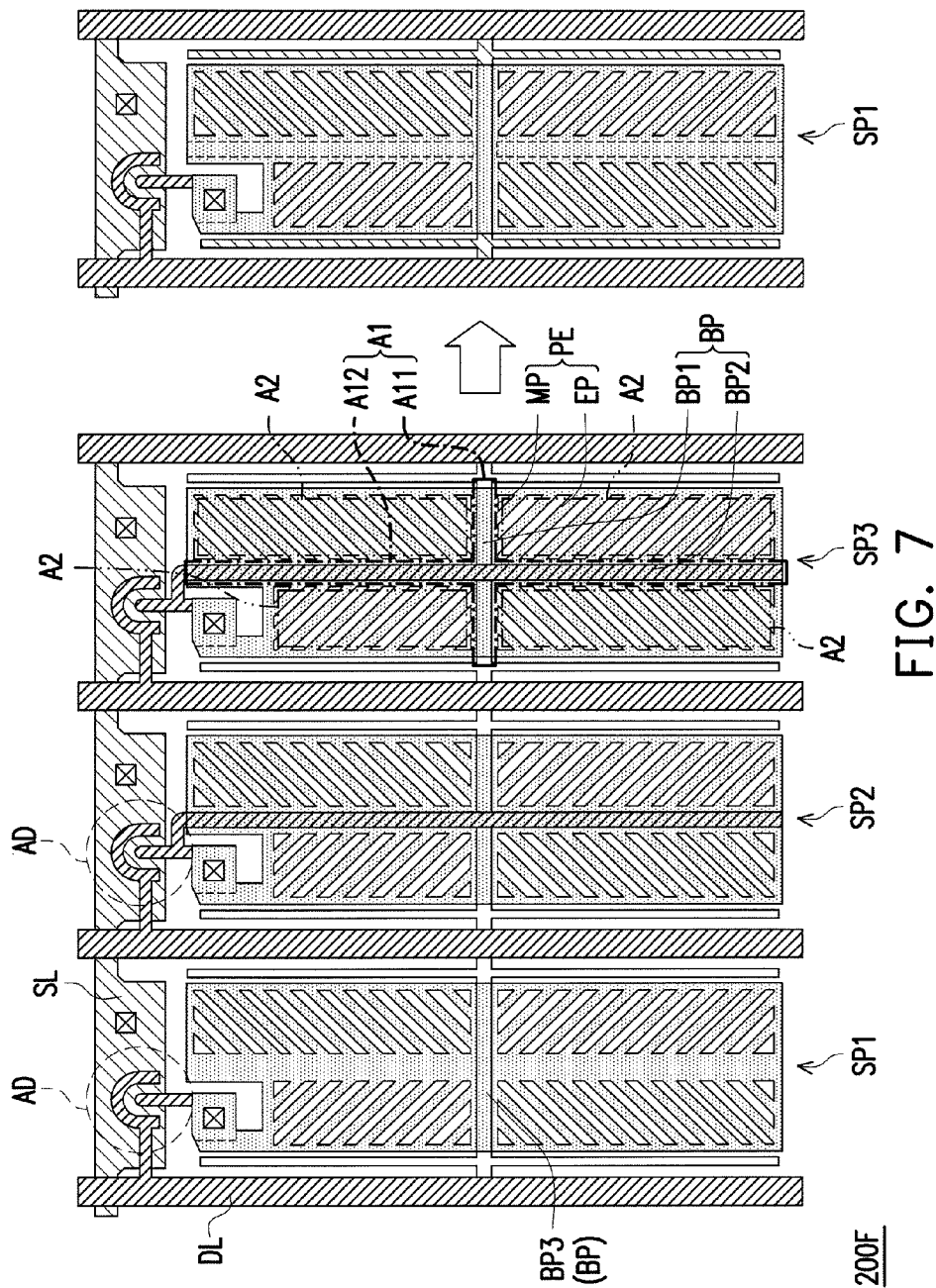

As shown in FIG. 5 to FIG. 7, in the pixel structures 200D, 200E, and 200F, each of the light-shielding patterns BP in the second and third sub-pixels SP2 and SP3 includes a first light-shielding portion BP1 and a second light-shielding portion BP2, an area of the first light-shielding portion BP1 is X1, an area of the second light-shielding portion BP2 is X2, and the first light-shielding portion BP1 intersects with the second light-shielding portion BP2. Besides, the light-shielding pattern BP in the first sub-pixel SP1 merely includes a fourth light-shielding portion BP4 (as shown in FIG. 5) or a third light-shielding portion BP3 (as shown in FIG. 6 and FIG. 7), an area of the fourth light-shielding portion BP4 is Y2, and an area of the third light-shielding portion BP3 is Y1. As shown in FIG. 5, the fourth light-shielding portion BP4 is parallel to the second light-shielding portion BP2. As shown in FIG. 6 and FIG. 7, the first light-shielding portion BP1 is parallel to the third light-shielding portion BP3 and intersect with the second light-shielding portion BP2. The first light-shielding portion BP1 is orthogonal to the second light-shielding portion BP2, for instance. Namely, the shape of each light-shielding pattern BP in the second and third sub-pixels SP2 and SP3 is the cross shape, for instance, and the shape of the light-shielding pattern BP in the first sub-pixel SP1 is the bar shape, for instance.

In the pixel structure 200D shown in FIG. 5, the second and fourth light-shielding portions BP2 and BP4 are formed by the same film layer, and the first light-shielding portions BP1 are formed by another film layer. Here, the first and second light-shielding portions BP1 and BP2 belong to different film layers. Specifically, the first light-shielding portions BP1 in the pixel structure 200D and the scan lines SL belong to the same film layer, and the second and fourth light-shielding portions BP2 and BP4 in the pixel structure 200D and the data lines DL belong to the same film layer. As clearly shown in FIG. 5, the overlapping area (i.e., X2) of the second light-shielding portions BP2 in the second and third sub-pixels SP2 and SP3 and the second disclination area A12 is greater than the overlapping area (i.e., Y2) of the fourth light-shielding portion BP4 in the first sub-pixel SP1 and the second disclination area A12, and the aforesaid relation (4) need be satisfied. Besides, in the pixel structure 200D, the overlapping area (i.e., X1) of the first light-shielding portions BP1 in the second and third sub-pixels SP2 and SP3 and the first disclination area A11 is greater than the overlapping area (i.e., Y1) of the light-shielding pattern BP in the first sub-pixel SP1 and the first disclination area A11, and the aforesaid relation (3) need be satisfied. Here, Y1=0. The pixel structure 200D provided herein simultaneously satisfies both the relation (3) and the relation (4).

In the pixel structure 200E shown in FIG. 6, the first, second, third, and fourth light-shielding portions BP1, BP2, BP3, and BP4 are formed by the same film layer. Specifically, the first, second, and fourth light-shielding portions BP1, BP2, and BP4 in the pixel structure 200E and the scan lines SL belong to the same film layer. As clearly shown in FIG. 6, the overlapping area (i.e., X2) of the second light-shielding portions BP2 in the second and third sub-pixels SP2 and SP3 and the second disclination area A12 is greater than the overlapping area (i.e., Y2) of the fourth light-shielding portion BP4 in the first sub-pixel SP1 and the second disclination area A12, and the aforesaid relation (4) need be satisfied. Besides, in the pixel structure 200E, the overlapping area of the first light-shielding portions BP1 and the first disclination area A11 is equal to the overlapping area of the third light-shielding portions BP3 and the first disclination area A11, the relation (4) is not satisfied. As long as one of the relations (3) and (4) is satisfied by the pixel structure 200E provided in the present embodiment, the color shift defect occurring at the large view angle can be lessened.

In the pixel structure 200F shown in FIG. 7, the first and third light-shielding portions BP1 and BP3 are formed by the same film layer, and the second light-shielding portions BP2 are formed by another film layer. Specifically, the first and third light-shielding portions BP1 and BP3 in the pixel structure 200F and the scan lines SL belong to the same film layer, and the second light-shielding portions BP2 in the pixel structure 200F and the data lines DL belong to the same film layer. As clearly shown in FIG. 7, the overlapping area (i.e., X2) of the second light-shielding portions BP2 in the second and third sub-pixels SP2 and SP3 and the second disclination area A12 is greater than the overlapping area (i.e., Y2) of the fourth light-shielding portion BP4 in the first sub-pixel SP1 and the second disclination area A12, and the aforesaid relation (4) need be satisfied. Besides, in the pixel structure 200F, the overlapping area of the first light-shielding portions BP1 and the first disclination area A11 is equal to the overlapping area of the third light-shielding portions BP3 and the first disclination area A11, the relation (4) is not satisfied. As long as one of the relations (3) and (4) is satisfied by the pixel structure 200F provided in the present embodiment, the color shift defect occurring at the large view angle can be lessened.

Figure 8:
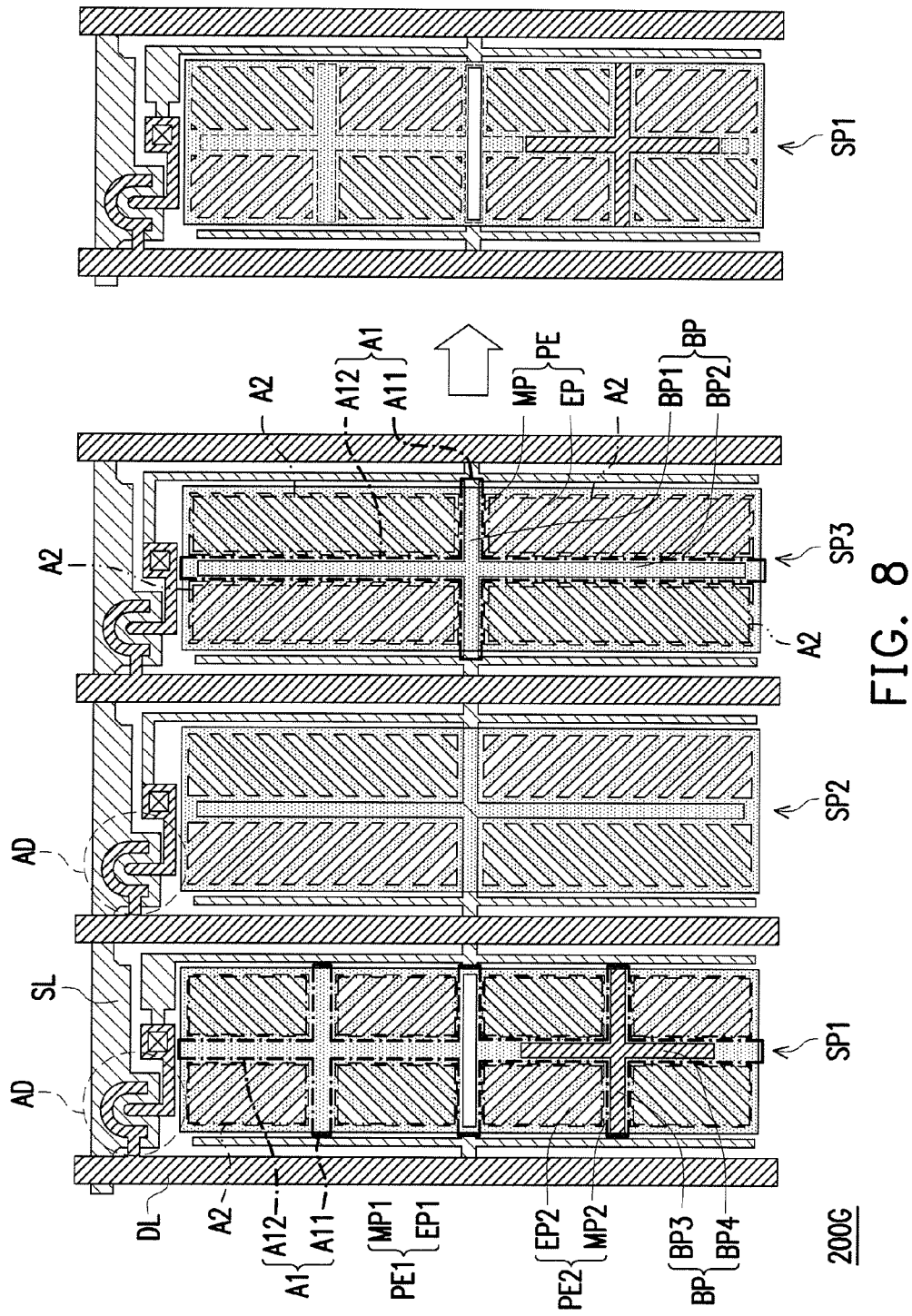

In the pixel structure 200G shown in FIG. 8, the first sub-pixel SP1 has the eight-domain design, and each of the second and third sub-pixels SP2 and SP3 has the four-domain design. Specifically, the first sub-pixel SP1 includes a main pixel electrode PE1 and a secondary pixel electrode PE2. The main pixel electrode PE1 includes a first main portion MP1 and a plurality of first branch portions EP 1 connected to the first main portion MP1. Each of the first branch portions EP 1 is separated by the first main portion MP1 and respectively corresponds to one of the domains A2. The secondary pixel electrode PE2 includes a second main portion MP2 and a plurality of second branch portions EP2 connected to the second main portion MP2. Each of the second branch portions EP2 is separated by the second main portion MP2 and respectively corresponds to one of the domains A2. The light-shielding pattern BP in the first sub-pixel SP1 is arranged corresponding to the second main portion MP2, and a gap GA is between the main pixel electrode PE1 and the secondary pixel electrode PE2. The gap GA, the first main portion MP1, and the second main portion MP2 collectively define the first disclination area A11 and the second disclination area A12 in the first sub-pixel SP1. As shown in FIG. 8, in the first sub-pixel SP1, only a portion of the first disclination area A11 and the second disclination area A12 collectively defined by the gap GA, the first main portion MP1, and the second main portion MP2 is not covered by the third and fourth light-shielding portions BP3 and BP4.

In the present embodiment, the main pixel electrode PE1 and the secondary pixel electrode PE2 may be coupled to different voltages through different active devices or through capacitance coupling. However, the invention is not limited thereto.

In the pixel structure 200G, if the first sub-pixel SP1 is the red sub-pixel, the gap GA and the second disclination area A12 that is not covered by the light-shielding pattern BP are conducive to raising the ratio of the red light at the large view angle. Particularly, the total area of the first and second disclination areas A11 and A12 in the first sub-pixel SP1 is greater than the total area of the first and second disclination areas A11 and A12 in the second and third sub-pixels SP2 and SP3; hence, the difference in the design of the first, second, and third sub-pixels SP1, SP2, and SP3 allows the color shift defect at the large view angle to be rectified.

In the first and second embodiments, if the pixel structure satisfies the relation (3) and/or the relation (4), the color shift defect of the pixel structure at the large view angle can be effectively lessened (i.e., the difference in hue can be controlled within an acceptable range). Otherwise, the pixel structure may encounter serious issues of color shift and difference in hue, as shown in the following table.

| (X1 − Y1)/Z or (X2 − Y2)/Z | Difference in Hue (45 degrees~0 degree) |
| --- | --- |
| 7.90% | approximately −5.92 |
| 5.93% | approximately −3.59 |
| 5.29% | approximately −2.75 |
| 3.95% | approximately −0.97 |
| 2.69% | approximately 0.95 |
| 1.98% | approximately 1.94 |
| 0.00% | approximately 5.04 |
| 5.17% | approximately −2.5 |
| 1.58% | approximately +2.5 |
| 3.32% | approximately 0 |

To sum up, in the previous embodiments, the transmittance of different sub-pixels may be modulated by changing at least one of the area of the light-shielding pattern in different sub-pixels, the width of the main portion, and the arrangement of the main portion. As a result, the pixel structure provided herein can resolve a view-angle induced color shift issue.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A pixel structure comprising a plurality of sub-pixels arranged in an array, each of the sub-pixels comprising an active device and a pixel electrode electrically connected to the active device, a disclination area and a plurality of domains separated by the disclination area being defined in each of the pixel electrodes, wherein a portion of the sub-pixels further comprises a light-shielding pattern arranged corresponding to the disclination area, the light-shielding pattern comprises a first light-shielding portion and a second light-shielding portion intersecting with each other, the first light-shielding portion has an area X1, the second light-shielding portion has an area X2, an area of each of the sub-pixels is Z, and X1, X2, and Z satisfy at least one of an equations of $1.58\% \leq X1/Z \leq 5.14\%$ and $1.58\% \leq X2/Z \leq 5.14\%$, wherein each of the pixel electrodes comprises: a main portion defining the disclination area; and a plurality of branch portions connected to the main portion, each of the branch portions being separated by the main portion and respectively corresponding to one of the domains.

2. The pixel structure of claim 1, wherein a shape of the main portion comprises a cross shape, each of the branch portions comprises a plurality of bar-shaped patterns, and the bar-shaped patterns extend obliquely and are parallel to each other.

3. The pixel structure of claim 2, wherein a shape of each of the light-shielding patterns comprises the cross shape.

4. The pixel structure of claim 1, wherein the sub-pixels not including the light-shielding patterns is a red sub-pixel, and the sub-pixels including the light-shielding patterns are blue sub-pixels and green sub-pixels.

5. A pixel structure comprising a plurality of sub-pixels arranged in an array, each of the sub-pixels comprising an active device, a pixel electrode electrically connected to the active device, and a light-shielding pattern, wherein a first disclination area, a second declination area intersecting with the first disclination area, and a plurality of domains separated by the first disclination area and the second disclination area are defined in each of the pixel electrodes, the sub-pixels comprise a first sub-pixel, a second sub-pixel, and a third sub-pixel, an overlapping area of the light-shielding patterns in the second and third sub-pixels and the first disclination area is X1, an overlapping area of the light-shielding patterns in the second and third sub-pixels and the second disclination area is X2, an overlapping area of the light-shielding pattern in the first sub-pixel and the first disclination area is Y1, an overlapping area of the light-shielding pattern in the first sub-pixel and the second disclination area is Y2, an area of each of the sub-pixels is Z, and an area of each of the sub-pixels is Z, and X1, X2, Y1, Y2, and Z satisfy at least one of an equations of $1.58\% \leq (X1-Y1)/Z \leq 5.14\%$ and $1.58\% \leq (X2-Y2)/Z \leq 5.14\%$, wherein each of the pixel electrodes comprises:
   a main portion defining the first disclination area and the second disclination area; and
   a plurality of branch portions connected to the main portion, each of the branch portions being separated by the main portion and respectively corresponding to one of the domains.

6. The pixel structure of claim 5, wherein a shape of the main portion comprises a cross shape, each of the branch portions comprises a plurality of bar-shaped patterns, and the bar-shaped patterns extend obliquely and are parallel to each other.

7. The pixel structure of claim 6, wherein a shape of each of the light-shielding patterns comprises the cross shape.

8. The pixel structure of claim 6, wherein the first sub-pixel is a red sub-pixel, and the second and third sub-pixels are blue and green sub-pixels.

9. The pixel structure of claim 5, wherein the light-shielding pattern in the second sub-pixel and the light-shielding pattern in the third sub-pixel respectively comprise a first light-shielding portion and a second light-shielding portion, an area of the first light-shielding portion is X1, an area of the second light-shielding portion is X2, the light-shielding pattern in the first sub-pixel comprises a third light-shielding portion and a fourth light-shielding portion, an area of the third light-shielding portion is Y1, an area of the fourth light-shielding portion is Y2, the first light-shielding portion is parallel to the third light-shielding portion and intersects with the second light-shielding portion, and the fourth light-shielding portion is parallel to the second light-shielding portion and intersects the third light-shielding portion.

10. The pixel structure of claim 9, wherein X1, X2, Y1, Y2, and Z merely satisfy the equation $1.58\% \leq (X1-Y1)/Z \leq 5.14\%$.

11. The pixel structure of claim 9, wherein X1, X2, Y1, Y2, and Z merely satisfy the equation $1.58\% \leq (X1-Y1)/Z \leq 5.14\%$ and the equation $1.58\% \leq (X2-Y2)/Z \leq 5.14\%$.

12. The pixel structure of claim 5, wherein each of the light-shielding pattern in the second sub-pixel and the light-shielding pattern in the third sub-pixel comprises a first light-shielding portion and a second light-shielding portion, an area of the first light-shielding portion is X1, an area of the second light-shielding portion is X2, and the first light-shielding portion is parallel to the light-shielding pattern in the first sub-pixel and intersects with the second light-shielding portion.

13. The pixel structure of claim 5, wherein each of the pixel electrodes in the second sub-pixel and the third sub-pixel comprises:
   a main portion defining the disclination area; and
   a plurality of branch portions connected to the main portion, each of the branch portions being separated by the main portion and respectively corresponding to one of the domains.

14. The pixel structure of claim 13, wherein a shape of the main portion comprises a cross shape, each of the branch portions comprises a plurality of bar-shaped patterns, and the bar-shaped patterns extend obliquely and are parallel to each other.

15. The pixel structure of claim 14, wherein a shape of each of the light-shielding patterns comprises the cross shape.

16. The pixel structure of claim 13, wherein the first sub-pixel comprises a main pixel electrode and a secondary pixel electrode, the main pixel electrode comprises a first main portion and a plurality of first branch portions connected to the first main portion, each of the first branch portions is separated by the first main portion and respectively corresponds to one of the domains, the secondary pixel electrode comprises a second main portion and a plurality of second branch portions connected to the second main portion, each of the second branch portions is separated by the second main portion and respectively corresponds to one of the domains, and the light-shielding pattern in the first sub-pixel is arranged corresponding to the second main portion.

17. The pixel structure of claim 16, wherein a gap is between the main pixel electrode and the secondary pixel electrode, and the gap, the first main portion, and the second main portion collectively define the first disclination area and the second disclination area in the first sub-pixel.

* * * * *